(12) United States Patent
Gibbs (10) Patent No.: US 11,046,133 B2
(45) Date of Patent: Jun. 29, 2021

(54) POWERTRAIN FOR AN AMPHIBIAN

(71) Applicant: GIBBS TECHNOLOGIES LIMITED, Nuneaton, Warwickshire (GB)

(72) Inventor: Alan Timothy Gibbs, London (GB)

(73) Assignee: Gibbs Technologies Limited, Warwickshire (GB)

( * ) Notice: Subject to any disclaimer, the term of this patent is extended or adjusted under 35 U.S.C. 154(b) by 0 days.

(21) Appl. No.: 15/568,323

(22) PCT Filed: Apr. 21, 2016

(86) PCT No.: PCT/GB2016/051110
§ 371 (c)(1),
(2) Date: Oct. 20, 2017

(87) PCT Pub. No.: WO2016/170343
PCT Pub. Date: Oct. 27, 2016

(65) Prior Publication Data
US 2018/0079267 A1    Mar. 22, 2018

(30) Foreign Application Priority Data

Apr. 21, 2015   (GB) .................................. 1506747

(51) Int. Cl.
*B60F 3/00*    (2006.01)
*B60K 17/08*   (2006.01)
*B60K 17/344*  (2006.01)

(52) U.S. Cl.
CPC ............ *B60F 3/003* (2013.01); *B60F 3/0007* (2013.01); *B60F 3/0015* (2013.01); *B60K 17/08* (2013.01);
(Continued)

(58) Field of Classification Search
CPC ...... B60F 3/0007; B60F 3/003; B60F 3/0015; B60F 3/00
See application file for complete search history.

(56) References Cited

U.S. PATENT DOCUMENTS 3,176,585 A    4/1965   Ruf
3,446,174 A    5/1969   Ballu
(Continued)

FOREIGN PATENT DOCUMENTS

CN    1446154 A     10/2003
CN    201342945 Y   11/2009
(Continued)

OTHER PUBLICATIONS

Euroean Patent Office; International Search Report; dated Jun. 22, 2016.

*Primary Examiner* — Stephen P Avila
(74) *Attorney, Agent, or Firm* — Price Heneveld LLP (57) ABSTRACT

The present invention provides, with reference to FIG. 1, a power train for an amphibian operable in land and marine modes. The power train comprises a prime mover, a first land propulsion device, a first marine propulsion device and a speed change transmission. The prime mover is arranged to drive the first land propulsion device through/via the speed change transmission in land mode. The prime mover, or at least a portion thereof, is located between the speed change transmission and a rearward most part of the amphibian, with the speed change transmission located spaced ahead of, in front of, the prime mover.

36 Claims, 3 Drawing Sheets

(52) U.S. Cl.
CPC ......... *B60K 17/344* (2013.01); *B60Y 2200/42* (2013.01); *B60Y 2300/19* (2013.01)

(56) References Cited

U.S. PATENT DOCUMENTS

| | | | | |
|---|---|---|---|---|
| 9,573,431 | B2* | 2/2017 | Gibbs | B60F 3/0007 |
| 2005/0239351 | A1* | 10/2005 | Darby | B60F 3/0038 |
| | | | | 440/12.51 |

FOREIGN PATENT DOCUMENTS

| | | | |
|---|---|---|---|
| CN | 2013342945 | * | 11/2009 |
| CN | 203221840 | | 10/2013 |
| CN | 103660822 A | | 3/2014 |
| FR | 2181604 | | 12/1973 |
| GB | 983939 | | 2/1965 |
| GB | 2429437 | * | 5/2008 |
| GB | 2429437 B | | 5/2008 |
| GB | 2514313 | | 11/2014 |
| SU | 395295 | | 8/1973 |
| WO | 0216158 A1 | | 2/2002 |
| WO | 0216159 A1 | | 2/2002 |
| WO | WO 02161158 | * | 2/2002 |
| WO | 0218161 | | 3/2002 |
| WO | 2005115775 | | 12/2005 |
| WO | 2012172350 A2 | | 12/2012 |
| WO | 2014084074 | | 6/2014 |

\* cited by examiner

POWERTRAIN FOR AN AMPHIBIAN

BACKGROUND OF THE INVENTION

The present invention relates to a power train particularly suitable for use in an amphibian capable of travel on land and water. More particularly, the power train is suitable for use in a high speed amphibian with at least one retractable wheel and/or track drive, and which is capable of planing on water and high speed travel on land (on or off-road, in two or four wheel drive). The present invention also relates to an amphibian having such a power train.

Power trains for use in amphibians are known in the art. These generally fall in into one of two categories. The first category comprises power trains for use in displacement only amphibians having limited and slow on-water performance. These are generally automotive use power trains modified to provide drive to a marine propulsion device. The second category is power trains for use in planing amphibians and which suffer from limited on-land performance. These are generally marine power trains modified to provide drive to a wheel.

More recently, however, the applicant has developed power trains for use in a new class of high speed amphibians having at least one retractable wheel and which are capable of planing on water. Furthermore, these high speed amphibians provide for good road handling when the amphibian is operated on land (on or off-road, in two or four wheel drive).

There remains, however, a need to improve on these prior art power trains by providing alternative configurations for the delivery of drive and power to the marine propulsion device(s) (e.g. one or more jet drives, propellers, etc.) for use of the amphibian on water, and to the land propulsion device(s) (e.g. one or more wheels, track drives, etc.) for use of the amphibian on land, as well as improved packaging of the power train. The need to retract wheels and/or wheel suspension assemblies or track drives presents significant problems in terms of packaging, weight distribution and also in terms of how the resulting power transmission pathways can be realised.

SUMMARY OF THE INVENTION

Accordingly, in a first aspect, the present invention provides a power train for an amphibian operable in land and marine modes, the power train comprising:
 a prime mover;
 a first land propulsion device;
 a first marine propulsion device; and
 a speed change transmission, wherein:
 the prime mover is arranged to drive the first land propulsion device through/via the speed change transmission in land mode; and
 the prime mover, or at least a portion thereof, is located between the speed change transmission and a rearward most part of the amphibian, with the speed change transmission located spaced ahead of, in front of, the prime mover.

Consequently, the prime mover and speed change transmission are spaced apart from one another along the length of the amphibian, with the speed change transmission arranged in front (ahead) of the prime mover. This enables packaging and weight distribution to be optimised for certain configurations, yet still enables the delivery of drive and power from the prime mover to the marine and land propulsion devices when operating in a marine mode (with the land propulsion devices retracted) or the land mode (with the land propulsion devices protracted).

In a second aspect, the present invention provides an amphibian comprising the power train as set forth herein.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
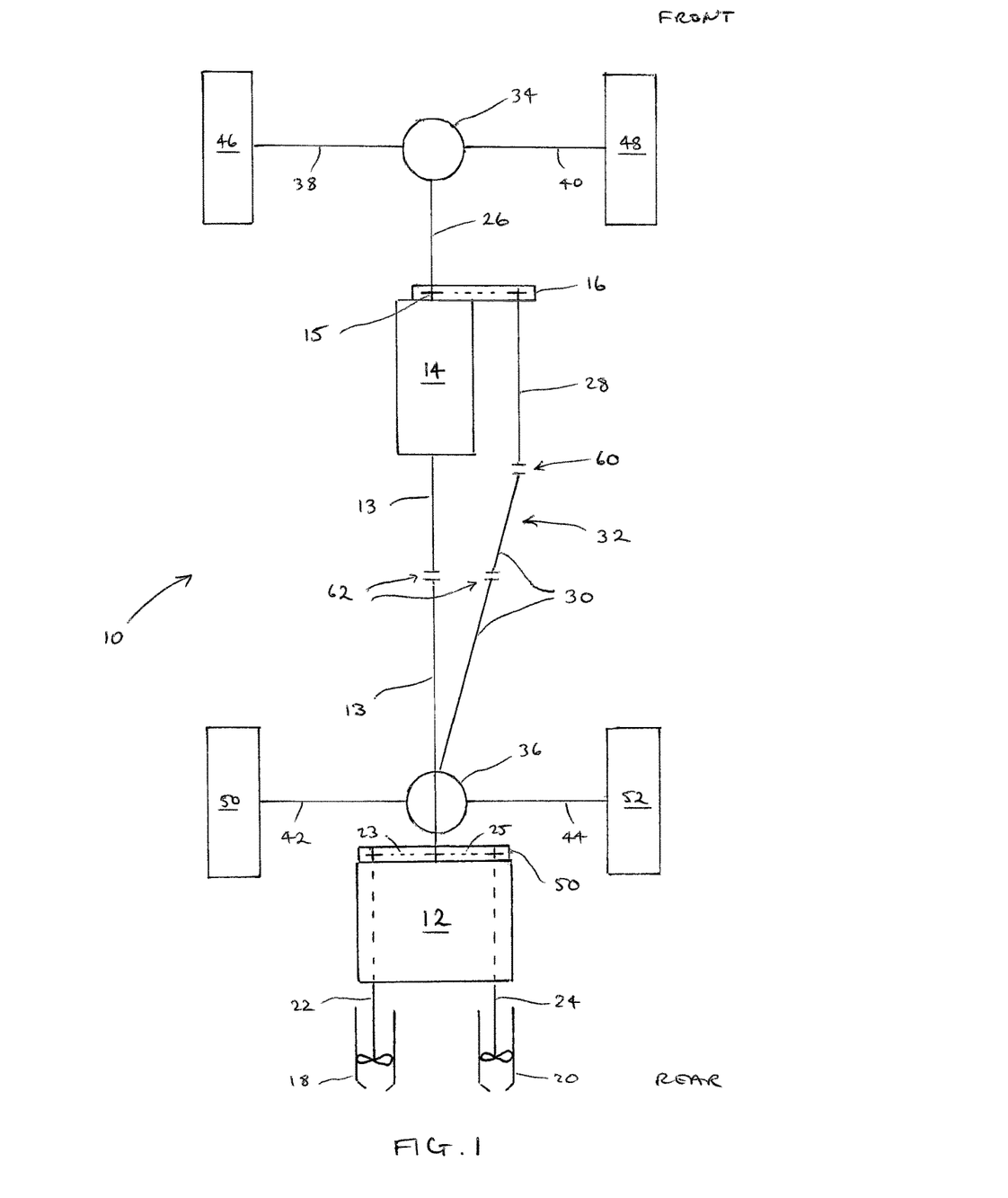
FIG. 1 is a schematic plan view from above of a power train according to a preferred embodiment the present invention.
Figure 2:
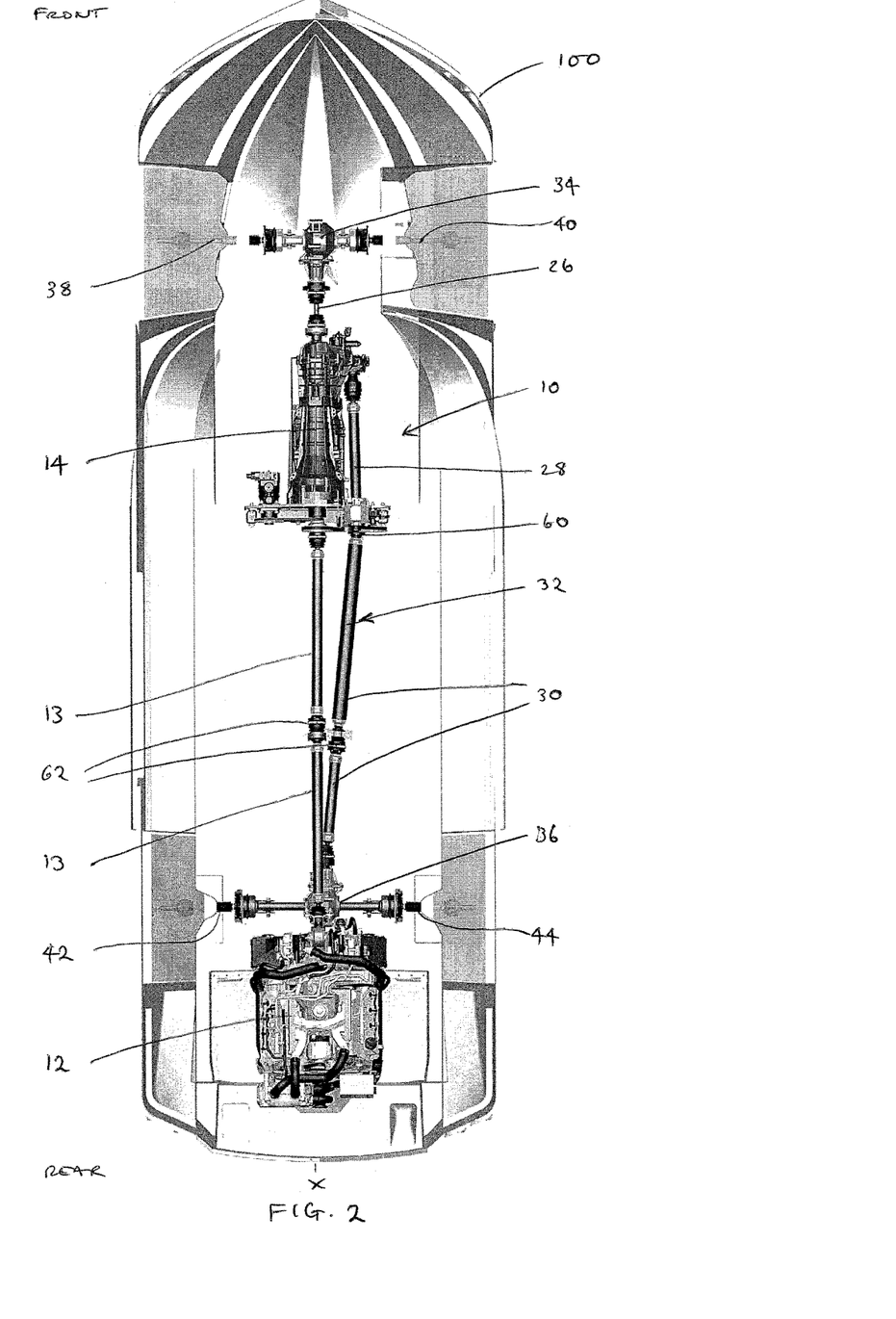
FIG. 2 is a schematic plan view from above of the power train of FIG. 1 located in the hull of an amphibian, with certain components (e.g. wheels) omitted for clarity.
Figure 3:
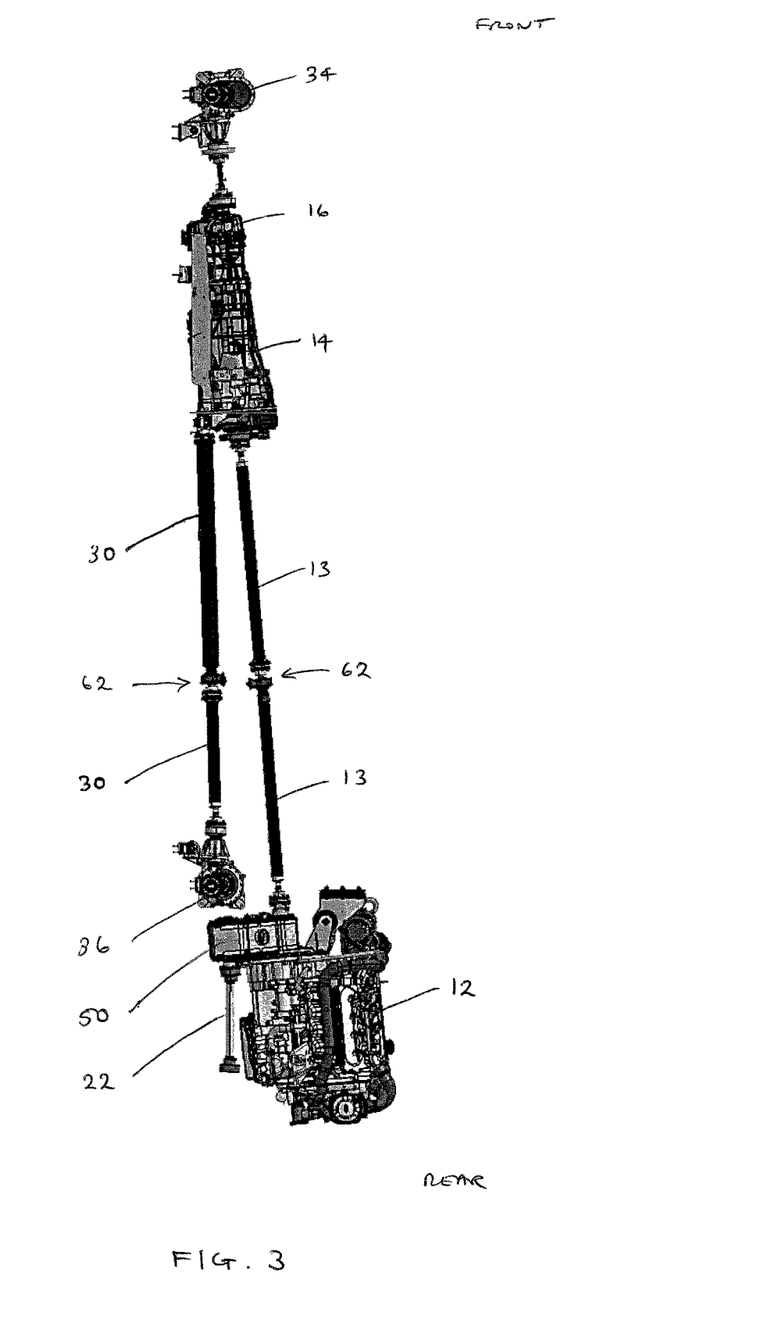
FIG. 3 is a schematic side elevation view of the power train of FIGS. 1 and 2.

Referring now to FIGS. 1 to 3, power train 10 can be seen to comprise:
 a prime mover, engine 12;
 a prime mover output drive shaft 13;
 a variable speed change transmission 14;
 a variable speed change transmission output drive shaft 15;
 a transfer case 16;
 two land propulsion drive shafts, front land propulsion drive shaft 26, and rear land propulsion drive shaft 32 formed of first shaft portion 28 and second shaft portion 30;
 two differentials, front differential 34 and rear differential 36;
 four half (axle) shafts, port and starboard front half shafts 38, 40 and port and starboard rear half shafts 42, 44;
 four wheels, port and starboard front wheels 46, 48 and port and starboard rear wheels 50, 52;
 power take-off 50;
 two marine propulsion drive shafts, port water jet drive shaft 22 and starboard water jet drive shaft 24; and
 two marine propulsion units, port water jet drive 18 and starboard water jet drive 20.

The prime mover 12 generates drive and power and transmits this on via the prime mover output drive shaft 13. The prime mover 12 may be of any suitable type. In this particular embodiment, the prime mover 12 is a compression ignition internal combustion engine. Drive shaft 13 leads drive and power from the prime mover 12 to, inter alia, the variable speed change transmission 14, with drive shaft 13 serving as an input drive shaft to the variable speed change transmission 14. Drive shaft 13 may optionally comprise drive shaft portions (as shown in FIGS. 1 to 3) coupled together via coupling 62, with provision for relative articulation therebetween (e.g. by way of a universal or other like joint), to provide flexibility in packaging and operation. The variable speed change transmission 14 may comprise a manual, sequential shift, semiautomatic or automatic gearbox, continuously variable transmission (CVT), or any suitable variable speed change transmission. The variable speed change transmission output drive shaft 15 leads drive and power (subjected to any speed change function) from the variable speed change transmission 14 to a transfer case 16, with drive shaft 15 serving as an input drive shaft to transfer case 16. The transfer case 16 is shown in front (ahead) of the variable speed change transmission 14 and mounted thereto, but could be spaced to the front of the variable speed change transmission 14. The prime mover 12 and the variable speed change transmission 14 are arranged spaced from one another. In this particular embodiment, they are arranged longitudinally in the amphibian, generally aligned with a longitudinal axis X-X of the hull 100 of the amphibian (see FIG. 2), but not necessarily on a centreline, with the variable speed change transmission 14 being mounted forward (ahead) of the prime mover 12. By using drive shaft 13, rather than mounting the variable speed change transmission 14 directly to the prime mover 12, the distance between the variable speed change transmission 14 and the prime mover 12 can be selected (increased or reduced) depending on the requirements of the amphibian, for example to suit the particular packaging requirements of the amphibian and/or to optimise its balance. In such a case, the respective lengths of drive shafts can be selected accordingly to suit. As shown in this particular embodiment, at least a portion of prime mover 12 is arranged rearward (aft) of the rear differential 36. More preferably, the prime mover 12 is arranged rearward (aft) of the rear differential 36. In addition, or alternatively, at least a portion of variable speed change transmission 14 is arranged forward (ahead) of the rear differential 36. More preferably, the variable speed change transmission 14 is arranged forward (ahead) of the rear differential 36.

Transfer case 16 transfers drive from the drive shaft 15 to the front and rear land propulsion drive shafts 26, 32 (drive shaft 32 being formed of drive shaft portions 28 and 30 coupled together). The ratio of drive between drive shaft 15 and drive shafts 26, 32 is 1:1 but may be another ratio (or a variable ratio) selected to suit the particular arrangement or operating conditions.

The front land propulsion drive shaft 26 leads drive and power from the transfer case 16 forwards (ahead) in the amphibian to the front differential 34. In turn, the front differential 34 provides drive to port front half shaft 38 and starboard front half shaft 40, and on to respective port front wheel 46 and starboard front wheel 48. As shown, the front differential 34 is generally aligned with a central longitudinal axis X-X of the hull 100 to allow for optimum packaging of the land propulsion protraction/retraction assemblies, optimising articulation on retraction. However, the front differential 34 may be arranged spaced laterally of a central longitudinal axis X-X of the hull 100 to provide flexibility.

The rear land propulsion drive shaft 32 (drive shaft 32 being formed of drive shaft portions 28 and 30 coupled together) runs rearwardly (aft) in the amphibian from the transfer case 16 to the rear differential 36 in order to transmit drive to the rear differential 36. In turn, the rear differential 36 provides drive to port rear half shaft 42 and starboard rear half shaft 44, and on to respective port rear wheel 50 and starboard rear wheel 52. The first and second drive shaft portions 28 and 30 are coupled together via coupling 60 with provision for relative articulation therebetween (e.g. by way of a universal, hookes, CV, or other like joint) and together extend between the transfer case 16 and the rear differential 34, arranged around the variable speed change transmission 14. As shown, first drive shaft portion 28 is spaced laterally from a central longitudinal axis X-X of the hull 100, with second drive shaft portion 30 arranged at an angle thereto towards a central longitudinal axis X-X of the hull 100 to allow the second drive shaft portion 30 to connect with, and drive, the rear differential 36. The angle at which the coupling 60 connects the drive shaft portions 28, 30 is selected based on the packaging requirements of the amphibian. In an alternative arrangement, the first drive shaft portion 28 may be spaced above or below the variable speed change transmission 14 to provide flexibility. As with front differential 34, rear differential 36 is generally aligned with a central longitudinal axis X-X of the hull 100 to allow for optimum packaging of the land propulsion protraction/retraction assemblies, optimising articulation on retraction. However, rear differential 36 may be arranged spaced laterally of a central longitudinal axis X-X of the hull 100 to provide flexibility. Second drive shaft portion 30 may optionally comprise drive shaft portions (as shown in FIGS. 1 to 3) coupled together via coupling 62, with provision for relative articulation therebetween (e.g. by way of a universal or other like joint), to provide flexibility in packaging and operation.

The front and rear differentials 34, 36 transmit drive to the respective front and rear wheels 46, 48, 50, 52 of the amphibian via half (axle) shafts 38, 40, 42, 44 in a conventional automotive manner. Constant velocity (CV) joints may be used as appropriate.

To enable drive from the prime mover 12 to the front and rear wheels 46, 48, 50, 52 to be selectively decoupled, for example when the vehicle is in marine mode, the variable speed change transmission can be put in neutral. Alternatively, for added flexibility, a rear decoupler (not shown) may be provided between the rear land propulsion drive shaft 32 and the rear differential 36 to enable drive from the prime mover 12 to the rear differential 36 to be selectively decoupled, for example when the vehicle is in marine mode. Similarly, a front decoupler (not shown) may be provided between the front land propulsion drive shaft 26 and the front differential 34 to enable drive from the prime mover 12 to the front differential 34 to be selectively decoupled in a similar manner to that described above for the rear differential.

Decouplers may also be provided in the drive line between any/some/all of the various components, for example between wheels 46, 48, 50, 52 and its associated driving half shaft 38, 40, 42, 44, and/or between any/some/all of driving half shaft 38, 40, 42, 44 and respective front and/or rear differentials 34, 36 to enable drive from the prime mover 12 to the wheels 46, 48, 50, 52 to be selectively coupled and decoupled at will. However, all such decouplers are not essential and can be omitted, or selected ones can be omitted. Where present, any suitable decoupler and associated actuation/control system may be employed. Constant velocity joints may be provided as necessary to provide tolerance for angular differences between components in the power train 10. In addition, constant velocity joints may be beneficially employed in wheel retraction for use of the amphibian on water in high speed planing mode and/or for steering.

Power take-off 50 is located at a position forward (ahead) of, and mounted to the front of, the prime mover 12. Alternatively, the power take-off 50 may be located at a position spaced forward (ahead) of, or mounted to the rear of, or spaced rearward (aft) of the primer mover 12. Power take-off 50 transfers drive and power from the output drive shaft 13 (or, alternatively a further drive shaft cooperating with drive shaft 13) to the port water jet drive shaft 22, via port belt 23, and to the starboard water jet drive shaft 24, via starboard belt 25. Power take-off 50 transfers drive and power at a ratio of 1.5:1 (input: output) and may be of any suitable type, for example, a belt drive, chain drive, or gear drive. Alternatively, the ratio may be another ratio (or a variable ratio) selected to suit the particular arrangement or operating conditions. Port water jet drive shaft 22 and starboard water jet drive shaft 24 are arranged generally parallel with, and offset laterally from, a central longitudinal axis X-X of the hull 100. As shown, these drive shafts 22, 24 are offset laterally but arranged below (or directly under) the lowest point prime mover 12. Alternatively, they may be offset laterally to an extent that they are arranged adjacent at least a portion of the prime mover 12, enabling at least a portion of the prime mover to be arranged lower in the amphibian, indeed lower in the hull 100 than these drive shafts 22, 24. This flexibility provides for the prime mover to be positioned lower in the amphibian and can lower the centre of gravity of the amphibian and adjust the metacentric height.

Port and starboard jet drive shafts 22, 24 extend rearward (aft) of the power take-off 50 to drive the impellers of port and starboard jet drives 18, 20, respectively.

In use, the power train 10 according to the present invention is extremely flexible and versatile. It can be operated in numerous different ways, these being selected by the amphibian's control systems and/or by or with inputs from the driver. In land mode (including ingress to and egress from the water), the amphibian may be driven in one, two, three or four wheel drive, and with various combinations of the individual wheels selected to provide drive. The jet drives 18, 20 are also driven in land mode. In marine mode, both water jets 18, 20 provide marine propulsion while drive to the wheels is prevented by putting the variable speed change transmission in neutral and/or decoupling of the decoupler(s). By way of example only, the following table indicates a number of the modes/options available in the particular configuration shown in FIG. 1:

|    | Mode | Wheel | Water Jet |
|----|------|-------|-----------|
| L  | Land |       |           |
| 1  | 1 wheel drive | Front port 46 | Port 18 and stbd 20 |
| 2  | 1 wheel drive | Front stbd 48 | Port 18 and stbd 20 |
| 3  | 1 wheel drive | Rear port 50 | Port 18 and stbd 20 |
| 4  | 1 wheel drive | Rear stbd 52 | Port 18 and stbd 20 |
| 5  | 2 wheel drive | Front port 46 Front stbd 48 | Port 18 and stbd 20 |
| 6  | 2 wheel drive | Rear port 50 Rear stbd 52 | Port 18 and stbd 20 |
| 7  | 2 wheel drive | Front port 46 Rear port 50 | Port 18 and stbd 20 |
| 8  | 2 wheel drive | Front stbd 48 Rear stbd 52 | Port 18 and stbd 20 |
| 9  | 2 wheel drive | Front port 46 Rear stbd 52 | Port 18 and stbd 20 |
| 10 | 2 wheel drive | Front stbd 48 Rear port 50 | Port 18 and stbd 20 |
| 11 | 4 wheel drive | Front port 46 Front stbd 48 Rear port 50 Rear stbd 52 | Port 18 and stbd 20 |
| 12 | Ingress/Egress | Front port 46 Front stbd 48 | Port 18 and stbd 20 |
| 13 | Ingress/Egress | Rear port 50 Rear stbd 52 | Port 18 and stbd 20 |
| 14 | Ingress/Egress | Any, some, all | Port 18 and stbd 20 |
| M  | Marine |     |           |
| 15 | Displacement | None, any, some, all | Port 18 and stbd 20 |
| 16 | Planing | None | Port 18 and stbd 20 |

Of course, further modes/options are available with other configurations. The flexibility and versatility of the power train 10 according to the present invention is thus readily appreciated from the above.

Although the prime mover 12 and the variable speed change transmission 14 are shown generally in line with a longitudinal axis of the hull 100 of the amphibian, alternative configurations are equally possible. For example, the prime mover 12 may be arranged transversely, with suitable arrangement of the other components.

FIG. 2 shows a preferred hull 100 of an amphibian in which a power train 10 according to the present invention (and particularly illustrated in FIGS. 1 and 3) is located.

Retractable wheel (and/or track drive) and suspension assemblies (not shown) as described in the applicant's patents and published patent applications are particularly suitable for use with the power train 10 of the present invention.

In the preferred embodiment shown in the Figures, the marine propulsion units shown indicatively are water jets drives 18, 20, but screw propellers or any other suitable marine propulsion means, system or combination may be employed. Further, two marine propulsion units are shown in the Figures and described above, but alternatively just one marine propulsion unit may be employed.

A universal or other suitable joint 62, 64 (e.g. hookes, or CV) is provided in the drive shafts 13 and 30 to provide additional flexibility in packaging. The angle at which the joints 62, 64 connect the respective shaft portions, and the lengths selected for the respective shaft portions, is based on the packaging requirements of the particular amphibian.

While decouplers have been described, components in the power train may be provided or supplied with integral decouplers, disconnects or locks (e.g. diff-locks) which can be used as appropriate. Furthermore, drive shafts may be single entities or formed from combinations of shorter drive shafts and/or stub shafts.

Whilst wheels have been described throughout as the land propulsion means, track drives or individual track drives (i.e. to replace a single wheel) may be used as an alternative or in combination with wheels.

Although the transfer case and power take-off have been described as having belts, they may be of any suitable type, for example, a belt drive, chain drive or gear drive.

Furthermore, the compression ignition internal combustion engine described for the prime mover 12 may instead comprise a spark ignition internal combustion engine, or an electric, hydraulic, or hybrid engine. Indeed, more than one of any such/alternative prime mover may be employed. A stealth mode may be incorporated where the prime mover limits noise and heat emissions. For example, the prime mover may incorporate motor generators which act as alternators to charge batteries, which charge is then used to power the vehicle for periods of time in a stealth mode.

Each feature disclosed in this specification (including the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of a method or process, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. A power train for an amphibian operable in land and marine modes, the power train comprising:
   a prime mover;
   a first land propulsion device;
   a first marine propulsion device; and
   a speed change transmission, wherein:
   the prime mover is arranged to drive the first land propulsion device via the speed change transmission in land mode; and
   at least a portion of the prime mover is located between the speed change transmission and a rearward most part of the amphibian, with the speed change transmission located spaced ahead of the prime mover by a selected distance using one or more drive shaft(s).

2. The power train as claimed in claim 1, wherein the first land propulsion device comprises at least one rear wheel or rear track drive or pair of rear wheels or pair of rear track drives.

3. The power train as claimed in claim 1, wherein at least a portion thereof of the prime mover is located spaced aft of the first land propulsion device.

4. The power train as claimed in claim 1, wherein at least a portion of the speed change transmission is located spaced ahead of the first land propulsion device.

5. The power train as claimed in claim 1, wherein the power train further comprises a first differential connected to the speed change transmission via a first land propulsion drive shaft, and wherein the speed change transmission is arranged to drive the first land propulsion device via the first land propulsion drive shaft and the first differential.

6. The power train as claimed in claim 5, wherein the first differential includes a rear differential and the first land propulsion drive shaft includes a rear land propulsion drive shaft.

7. The power train as claimed in claim 1, wherein the power train further comprises one or more decouplers arranged to selectively decouple the prime mover from the first land propulsion device.

8. The power train as claimed in claim 1, the power train further comprising a second land propulsion device, and wherein the prime mover is arranged to drive the second land propulsion device via the at least one speed change transmission in land mode.

9. The power train as claimed in claim 8, wherein the second land propulsion device comprises at least one front wheel or front track drive or pair of front wheels or pair of front track drives.

10. The power train as claimed in claim 8, wherein the power train further comprises a second differential connected to the speed change transmission via a second land propulsion drive shaft, and wherein the speed change transmission is arranged to drive the second land propulsion device via the second land propulsion drive shaft and the second differential.

11. The power train as claimed in claim 10, wherein the second differential includes a front differential and the second land propulsion drive shaft includes a front land propulsion drive shaft.

12. The power train as claimed in claim 1, the power train further comprising a first transfer case or power take off arranged to receive drive, when drive is provided, from the speed change transmission.

13. The power train as claimed in claim 12, wherein the speed change transmission is arranged to drive the at least one of the first land propulsion device and the second land propulsion device via the first transfer case or power take off.

14. The power train as claimed in claim 5, wherein at least a portion of the first land propulsion drive shaft runs adjacent the speed change transmission, either to the side, above or below the speed change transmission.

15. The power train as claimed in claim 5, wherein the first land propulsion drive shaft comprises a first shaft portion coupled to a second shaft portion, wherein the second shaft portion is arranged to transmit drive from the first shaft portion to the first differential.

16. The power train as claimed in claim 15, wherein the second shaft portion is coupled to the first shaft portion by a universal, a hooker or a CV joint such that the longitudinal axis of the second shaft portion may be arranged at an angle to the longitudinal axis of the first shaft portion.

17. The power train as claimed in claim 15, wherein the second shaft portion is coupled to the first shaft portion by a belt drive, a gear drive, a chain drive or other such arrangement such that the longitudinal axis of the second shaft portion is offset laterally from the longitudinal axis of the first shaft portion, either substantially parallel or otherwise.

18. The power train as claimed in claim 15, wherein the first shaft portion is coupled to the second shaft portion at a location in front of the prime mover.

19. The power train as claimed in claim 8, wherein the power train further comprises one or more decouplers arranged to selectively decouple the prime mover from the second land propulsion device.

20. The power train as claimed in claim 7, further comprising control means to selectively activate and deactivate any of the one or more decouplers in the power train.

21. The power train as claimed in claim 1, wherein the prime mover is arranged to drive, when drive is provided, the first marine propulsion device via a first marine propulsion drive shaft.

22. The power train as claimed in claim 21, wherein the power train comprises a second marine propulsion device and the prime mover is arranged to drive, when drive is provided, the second marine propulsion device via a second marine propulsion drive shaft.

23. The power train as claimed in claim 21, wherein the power train further comprises a second power take off or transfer case arranged to receive drive directly from the prime mover, the second power take off or transfer case arranged to drive, when drive is provided, the first and/or a second marine propulsion drive shaft.

24. The power train as claimed in claim 23, wherein the second power take off or transfer case is arranged to selectively alter the transmission ratio between the prime mover and a third marine propulsion shaft.

25. The power train as claimed in claim 1, wherein the prime mover comprises any one or combination of a spark ignition internal combustion engine, a compression ignition internal combustion engine, an electric motor, a hydraulic motor, a hybrid engine, or a motor generator.

26. The power train as claimed in claim 1, wherein either one or both of the first marine propulsion device and a second marine propulsion device comprise either a water jet, or a propeller.

27. The power train according to claim 1, wherein the speed change transmission comprises a variable speed change transmission.

28. The power train according to claim 1, wherein the speed change transmission comprises any one or more of a manual, sequential shift, semiautomatic, or automatic gearbox, or a continuously variable transmission.

29. The power train as claimed in claim 5, wherein the prime mover, or at least a portion thereof, is located spaced aft of, behind, the first differential.

30. The power train as claimed in claim 5, wherein the speed change transmission, or at least a portion thereof, is located spaced ahead of the first differential.

31. An amphibian comprising the power train of claim 1.

32. The amphibian as claimed in claim 31, wherein the prime mover is positioned substantially in line with a longitudinal axis of the amphibian.

33. The amphibian as claimed in claim 31, wherein the speed change transmission is located in front of the prime mover.

34. The amphibian as claimed in claim 31, wherein the first and/or a second land propulsion device may be retracted above the lowest point of the hull for use on water in marine mode, and may be protracted below the lowest point of the hull for use on land in land mode.

35. The amphibian as claimed in claim 31, wherein when the amphibian is operated in a marine mode the first and/or a second marine propulsion device can power the amphibian to a speed where sufficient hydrodynamic lift is achieved for the amphibian to plane.

36. The amphibian as claimed in claim 31, wherein when the amphibian is operated in a land mode it can be driven in one, two, three or four wheel drive.

\* \* \* \* \*

UNITED STATES PATENT AND TRADEMARK OFFICE
CERTIFICATE OF CORRECTION

PATENT NO. : 11,046,133 B2
APPLICATION NO. : 15/568323
DATED : June 29, 2021
INVENTOR(S) : Gibbs Page 1 of 1

It is certified that error appears in the above-identified patent and that said Letters Patent is hereby corrected as shown below:

In the Specification

Column 1, Line 14:
Delete "in"

Column 2, Line 10:
After "embodiment" insert -- of --

Column 2, Line 44:
Delete "on"

Column 3, Line 33:
"forwards" should be — forward —

Column 3, Line 54:
"hookes" should be — hooks —

Column 4, Line 54:
"primer" should be — prime —

Column 6, Line 12:
"jets" should be — jet —

Column 6, Line 18:
"hookes" should be — hooks —

In the Claims

Column 8, Claim 16, Line 24:
"hooker" should be — hookes —

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*